UNITED STATES PATENT OFFICE.

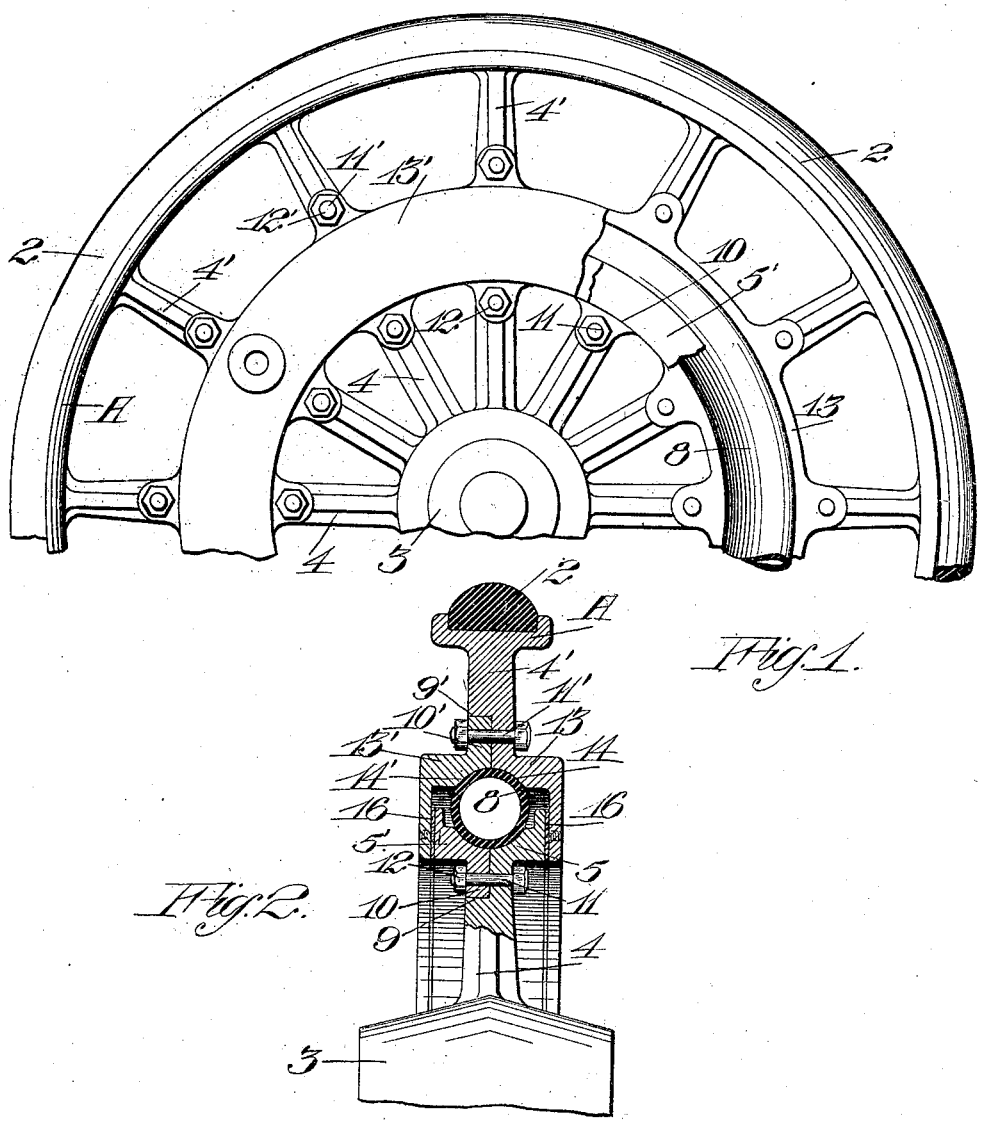

ERNEST LOUIS REGUIN, OF SAN FRANCISCO, CALIFORNIA.

VEHICLE-WHEEL.

1,004,819.  Specification of Letters Patent.  Patented Oct. 3, 1911.

Application filed May 11, 1910. Serial No. 560,596.

*To all whom it may concern:*

Be it known that I, ERNEST L. REGUIN, a citizen of the United States, residing in the city and county of San Francisco and State of California, have invented new and useful Improvements in Vehicle-Wheels, of which the following is a specification.

This invention relates to a vehicle wheel and particularly pertains to a vehicle wheel in which a pneumatic, resilient member is interposed between the wheel-rim and the hub.

It is the object of this invention to provide a vehicle wheel in which the resilient portion of the wheel is located within the wheel-rim, where it will be protected from injury and be effectively shielded against dislocation and damage.

A further object is to provide a simple and practical means by which the resilient member may be quickly and easily removed and replaced, and for securing it against undue lateral movement.

Another object is to provide a vehicle wheel having the combined advantages of a solid-tired wheel and a resilient wheel.

The invention consists of the parts and the construction and combination of parts as hereinafter more fully described and claimed, having reference to the accompanying drawings, in which—

Figure 1 is a view in elevation of the upper portion of a wheel constructed in accordance with my invention. Fig. 2 is a cross-section of same showing the manner of assembling.

In the drawings A represents the rim of a wheel which may or may not be fitted with a cushion or hard rubber tire or tread 2.

3 indicates the wheel-hub from which short spokes 4 radiate, these spokes terminating in an annular rim composed of the respective fixed and removable sections 5—5' disposed between the hub 3 and the outer rim A, and normally concentric therewith. Rim section 5 is preferably integral with spokes 4 and projects laterally beyond one side of the spokes 4 to form an angular, annular rim-flange to support one side, and half the bottom, of the inflatable tube 8. The radial spokes 4 are recessed on their outer ends at 9, so as to receive a ring portion 10 the outer face of which is flush with the edges of the spokes. This portion 10 is adapted to be secured to each spoke 4 by means of bolts 11 and nuts 12, the bolts 11 passing through perforations in the ring which register with like perforations in the spokes 4. The ring portion 10 is provided with the complementary rim section 5' corresponding with, and oppositely disposed to, the rim-flange 5 on the spokes 4. The bottoms of the two sections are circumferentially grooved to form a seat for the pneumatic tube 8.

Carried by the outer rim A is a channel ring in two sections 13—13' which telescope with the sections 5—5' and coöperate therewith to house the tube 8. The section 13 has short spokes 4' and is made integral with the outer rim A. These spokes 4' are recessed at 9' in a manner corresponding with the recesses 9 on the spokes 4 to receive the ring portion 10' which is adapted to be secured to the spokes 4' in the recess 9' by means of bolts 11' and nuts 12'. The section 13' is formed on the outer ring portion 10', and extends outside of and concentric with the rim-flange 5' on the inner ring portion 10. The inner peripheral surface of the rim-flanges or sections 13—13' are circumferentially grooved at 14—14' on their adjacent edges to form an annular channel in which the outer periphery of the inflated tube 8 seats. 16 represents bronze or like face plates to reduce wear where metal slides on metal. The two removable sections 5' and 13' are substantially Z-shaped in cross-section as shown.

In assembling the wheel, the two sections 5'—13' are removed and the tube or pneumatic tire 8 inserted in position between the inner and outer rim-flanges 5—13 respectively, whereupon the inner section 5' is placed in position on the spokes 4, as before described, and secured in place by means of the bolts 11 and nuts 12. The outer section 13' is then secured to the spokes 4' by the bolts 11' and nuts 12', as before described. This being accomplished, the pneumatic tire 8 becomes securely seated in operative position between the inner rim-section 5—5' and the outer rim-sections 13—13'. The tube 8, thus being disposed intermediate of the hub 3 and outer rim A, is not subjected to frictional wear nor liable to puncture, yet is free to absorb shocks in the manner common to pneumatic tires. Channel seats 5—5', 13—13' with their telescoping side flanges prevent any lateral movement of the tube 8, yet permit of its being compressed vertically, sufficient space being provided inside the channels to admit of the tire 8 being expanded sidewise when subjected to pressure on top and bottom.

Having thus described my invention, what I claim and desire to secure by Letters Patent is—

1. In a vehicle wheel, the combination with a hub, of inner and outer separated rims, spokes on the hub supporting the inner rim, said spokes being recessed on one side from their outer ends to a point terminating short of the hub, said inner rim comprising a channel ring divided circumferentially into two sections, one of which sections is in the form of a removable flanged ring substantially Z-shape in cross section, and having one of its flanges fitting the recessed portions of the spokes, and the other section of said channel ring being integral with the spokes, the outer rim forming a complementary channel of larger diameter than, and slidably embracing the inner channel ring, and having a removable member on the same side of the wheel as the removable flanged ring of the inner rim, and overlapping said ring, and an inflatable tube housed between said channels.

2. In a vehicle wheel, the combination with a hub having radial spokes, said spokes being recessed on one side from their outer ends to a point terminating short of the hub, of a channel rim carried by said spokes, said rim divided circumferentially into two sections, one of which is in the form of a removable ring having substantially Z-shape in cross section, one of the flanges of said ring fitting in the recessed portions of the spokes, and an outer rim carrying an inwardly projecting annular channel of larger diameter than, and slidably embracing, said inner channel, said outer channel circumferentially divided into two sections, one of which is in the form of a removable ring, and an inflatable tube housed in the channel, said removable rings being both on the same side of the wheel and one overlapping the other.

3. In a vehicle wheel, the combination with a hub, of inner and outer separated rims, spokes on the hub supporting the inner rim, said inner rim comprising a channel ring divided circumferentially into two sections, one of which sections is in the form of a removable ring substantially Z-shaped in cross section, and the other section of said channel ring being integral with the spokes, the outer rim carrying a supplemental channel of larger diameter than, and slidably embracing, the inner channel rim, said outer channel divided circumferentially into two sections, one of which is removable, and the other of which is integral with the outer rim.

In testimony whereof I have hereunto set my hand in the presence of two subscribing witnesses.

ERNEST LOUIS REGUIN.

Witnesses:
FRANK H. MCNALLY,
JAS. F. ZEVLIN.